US007291190B2

(12) United States Patent
Dummelow et al.

(10) Patent No.: US 7,291,190 B2
(45) Date of Patent: Nov. 6, 2007

(54) CYCLONIC SEPARATING APPARATUS

(75) Inventors: Anthony Joseph Dummelow, Dursley (GB); David Stuart Harris, Milton (GB); Ricardo Gomiciaga-Pereda, Malmesbury (GB)

(73) Assignee: Dyson Technology Limited, Wiltshire (GB)

(*) Notice: Subject to any disclaimer, the term of this patent is extended or adjusted under 35 U.S.C. 154(b) by 457 days.

(21) Appl. No.: 10/504,430

(22) PCT Filed: Feb. 4, 2003

(86) PCT No.: PCT/GB03/00503

§ 371 (c)(1),
(2), (4) Date: Jan. 11, 2005

(87) PCT Pub. No.: WO03/068407

PCT Pub. Date: Aug. 21, 2003

(65) Prior Publication Data

US 2005/0102982 A1 May 19, 2005

(30) Foreign Application Priority Data

Feb. 16, 2002 (GB) ................................ 0203723.2

(51) Int. Cl.
*B01D 45/12* (2006.01)

(52) U.S. Cl. ........................ 55/349; 55/428; 55/459.1; 55/DIG. 3

(58) Field of Classification Search .................. 55/343, 55/346, 349, 428, 429, 459.1, DIG. 3
See application file for complete search history.

(56) References Cited

U.S. PATENT DOCUMENTS

| | | | | |
|---|---|---|---|---|
| 1,505,166 | A | 8/1924 | Rupp | |
| 2,134,978 | A | 1/1938 | Marshall | |
| 4,451,358 | A | 5/1984 | Chupka | |
| 5,160,356 | A | 11/1992 | Dyson | |
| 6,174,339 | B1 | 1/2001 | Varady | |
| 2005/0050864 | A1* | 3/2005 | Oh et al. | 55/345 |

FOREIGN PATENT DOCUMENTS

| | | |
|---|---|---|
| CA | 450430 | 8/1948 |
| CA | 619363 | 5/1961 |
| CA | 1060355 | 8/1979 |
| CA | 1251147 | 3/1989 |
| CA | 2295692 | 1/1999 |
| DE | 1679609 | 7/1954 |
| EP | 0 042 723 | 12/1981 |
| GB | 2360719 | 3/2001 |
| JP | 2000084438 | 3/2000 |
| WO | WO 98/35601 | 8/1998 |

* cited by examiner

*Primary Examiner*—Robert A. Hopkins
(74) *Attorney, Agent, or Firm*—Morrison & Foerster, LLP

(57) ABSTRACT

A cyclonic separating apparatus includes at least one cyclone having a first end, a second end a longitudinal axis. An inlet is located at the first end for introducing a fluid flow into the cyclone, and a cone opening is located at the second end. At least part of the cone opening lies in a plane inclined at an angle to the longitudinal axis

28 Claims, 7 Drawing Sheets

CYCLONIC SEPARATING APPARATUS

FIELD OF THE INVENTION

The invention relates to cyclonic separating apparatus. Particularly, but not exclusively, the invention relates to cyclonic separating apparatus suitable for use in a vacuum cleaner.

BACKGROUND OF THE INVENTION

Cyclonic separating apparatus is known, for example, from EP 0 042 723 and U.S. Pat. No. 5,160,356. Both examples show domestic vacuum cleaners which operate using reverse flow cyclones to achieve particle separation. Such apparatus generally provides a cyclone body having a tangential inlet. Dirt-laden fluid flow enters the inlet and follows a helical path around the interior of the cyclone body. Centrifugal forces act on the entrained dirt to separate the dirt from the flow. The separated dirt collects at the base of the cyclone body for subsequent removal from the apparatus. The cleaned flow then changes direction and flows back up the cyclone body to exit the cyclone body via a centrally located outlet provided at the same end of the cyclone body as the inlet. Axial flow cyclonic separators can be used as an alternative to reverse flow cyclonic separators in which the cleaned flow exits the cyclone body at the same end of the cyclone body as the separated dust.

It is a known advantage to have a number of cyclones working in parallel within cyclonic separating apparatus. Each individual cyclone is small in comparison to that used in an equivalent single cyclone apparatus. The relatively small size of each individual cyclone has the effect of increasing the centrifugal force acting on particles entrained in the airflow passing through the cyclone body. This increase in the force results in an increase in the separation efficiency of the apparatus.

Cyclones can be prone to blocking. In particular, small cyclones are more likely to become blocked because there is a smaller area for the dust to pass through. Such blockages can cause a reduction in flow which has the overall effect of reducing the separation efficiency. A substantial blockage may completely stop the flow from passing through the cyclone.

SUMMARY OF THE INVENTION

It is an object of the present invention to provide cyclonic separating apparatus in which the risk of blockage of a cyclone is reduced.

The invention provides cyclonic separating apparatus comprising at least one cyclone, the cyclone having a first end and a second end, an inlet being located at the first end for introducing a fluid flow into the cyclone, a cone opening being located at the second end, the cyclone further comprising a longitudinal axis, wherein at least part of the cone opening lies in a plane inclined at an angle to the longitudinal axis. The configuration of the cone opening provides a greater area for the dirt to pass through which helps to prevent blockages occurring in the cyclone.

Preferably, the plane is inclined at an angle of between 40° and 80° to the longitudinal axis. More preferably, the plane is inclined at an angle of substantially 60° to the longitudinal axis. It has been found that at this angle cone blocking is less likely to occur and there is no increased risk of the separated dust being re-entrained.

In a preferred embodiment, the cyclone projects into the collector. This enables any dust which has been separated from the flow to be contained and so prevented from passing into the surrounding atmosphere. The contained dust can then be emptied from the collector in a safe and hygienic manner. Preferably, the collector has a portion having a substantially circular cross section, the diameter of the said portion being at least three times the diameter of the cone opening. More preferably, the said portion lies in a plane which intersects the cone opening. In this configuration, the separation performance may be optimised and the dust collected more efficiently.

The invention is particularly suited to use with a plurality of cyclones. The effect of passing the dust laden flow through a plurality of cyclones arranged in parallel is to enhance the separation efficiency of the apparatus. It is an advantage to have all of the cyclones communicating with a single collector to ensure that all of the dust separated from the flow can be disposed of easily and efficiently.

In this case, it is preferred that the cone opening has a lowermost portion which extends furthest from the first end of the cyclone and the said lowermost portion faces the wall of the collector. In this orientation, it is believed that separation of the entrained dust is optimised and the risk of cone blocking is reduced.

BRIEF DESCRIPTION OF THE DRAWINGS

Embodiments of the invention will now be described, by way of example only, with reference to the accompanying drawings, wherein.

DETAILED DESCRIPTION OF THE INVENTION

Figure 1:
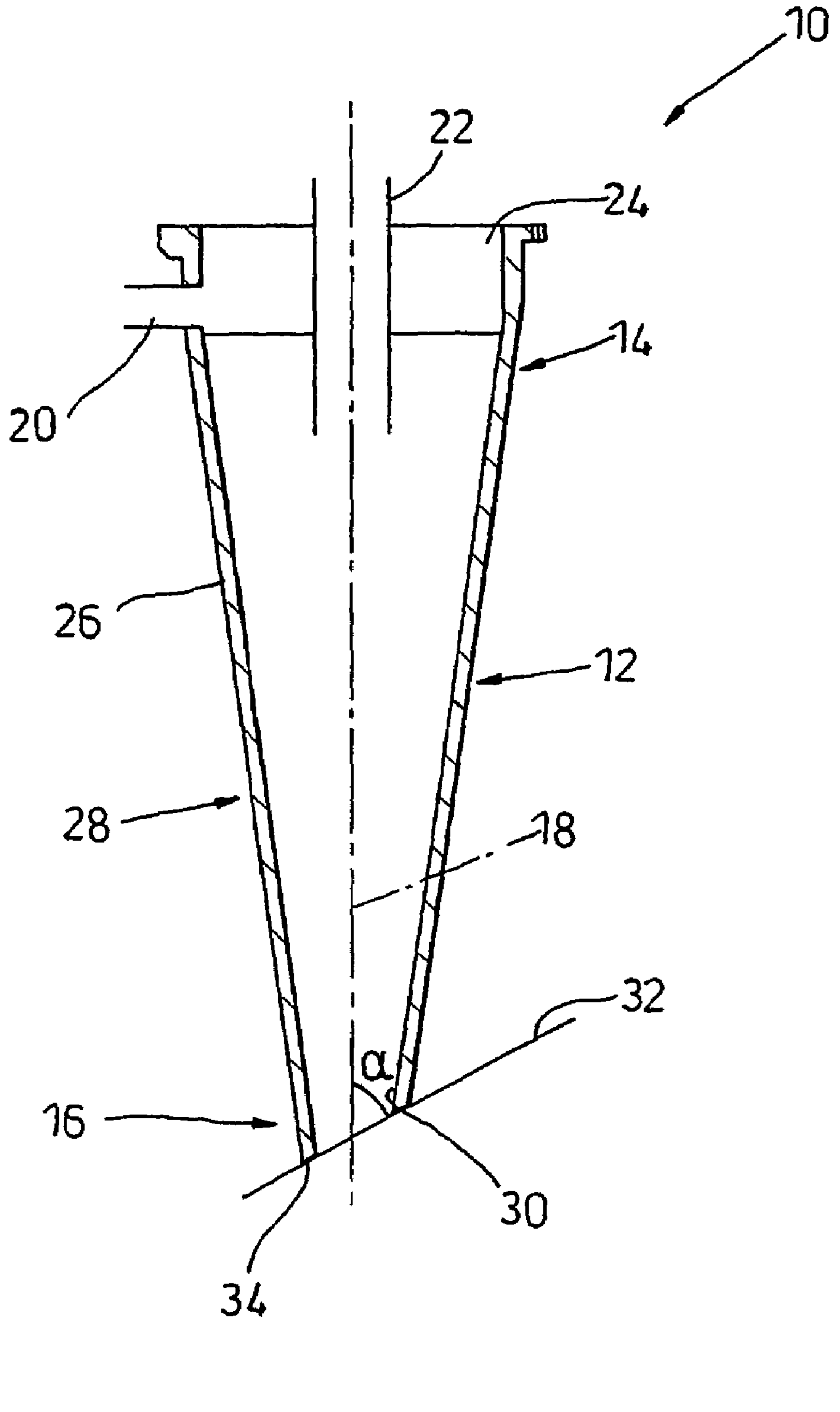
FIG. 1 is a sectional side view of cyclonic separating apparatus according to a first embodiment of the invention.

FIG. 1 shows a first embodiment of cyclonic separating apparatus 10 according to the invention. The cyclonic separating apparatus 10 comprises a cyclone 12 having a first end 14, a second end 16 and a longitudinal axis 18. The first end 14 is generally cylindrical and has an inlet 20 for introducing dust laden fluid, preferably air, into the cyclone 12. The inlet 20 is circular in cross-section and communicates tangentially with the first end 14. An outlet 22 is also provided at the first end 14 to direct cleaned air out of the cyclone 12. The outlet 22 lies on the longitudinal axis 18 and extends from the interior of the cyclone 12 and through an upper portion 24 of the first end 14.

A side wall 26 tapers inwardly towards the longitudinal axis 18 from the first end 14 towards the second end 16 to form a frusto-conical portion 28. A cone opening 30 is formed at a free end of the frusto-conical portion 28. The cone opening 30 lies in a plane 32 inclined at an angle $\alpha$ to the longitudinal axis 18. The angle $\alpha$ shown in FIG. 1 is substantially 60° to the longitudinal axis 18. As can be seen from the Figure, the cone opening 30 has a lowermost portion 34 which extends furthermost from the first end 14. The inclination of the plane 32 of the cone opening 30 ensures that the area of the cone opening 30 is enlarged in comparison to that of a cone opening lying in a plane arranged perpendicular to the longitudinal axis 18 of the cyclone 12.

Figure 2:
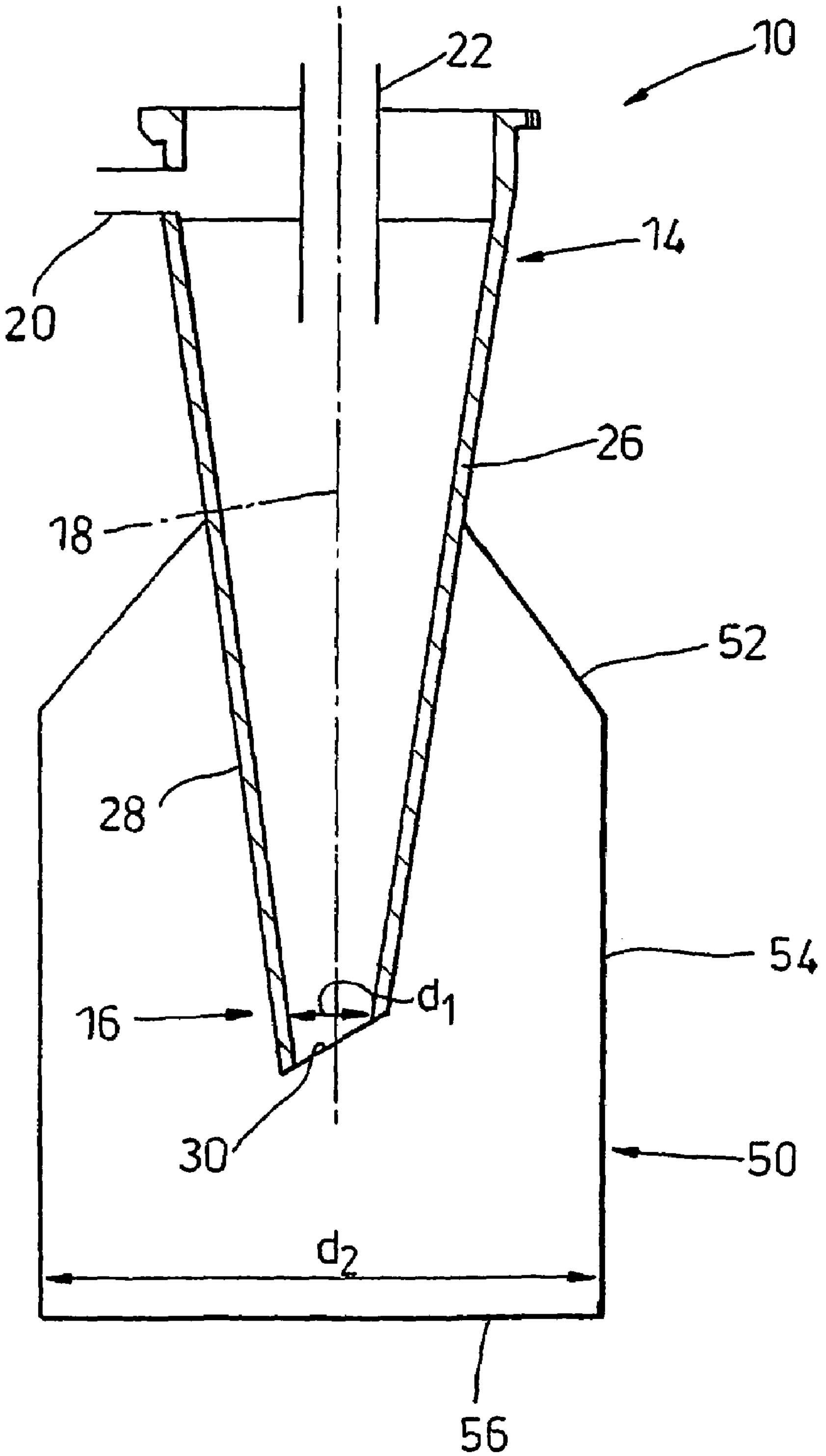
FIG. 2 is a sectional side view of cyclonic separating apparatus according to a second embodiment of the invention.

In a second embodiment, shown in FIG. 2, the cone opening 30 projects into a collector 50. The cyclonic separating apparatus 10 is otherwise the same as that shown in FIG. 1. The collector 50 comprises a frusto-conical upper portion 52 and a cylindrical body portion 54 which is closed by a circular base 56. The upper portion 52 abuts against the side wall 26 of the cyclone 12. The diameter $d_2$ of the circular base 56 is at least three times the projected diameter $d_1$ of the cone opening 30. The diameter $d_2$ shown in FIG. 2 is approximately six times the diameter $d_1$. To minimise any possibility of particle re-entrainment, the cone opening 30 is spaced from the body portion 54 and from the circular base 56.

In use, a dust-laden fluid flow enters the separating apparatus 10 via the inlet 20. The fluid flow is caused to follow a helical path around the interior of the cyclone 12 from the first end 14 downwardly towards the second end 16 and through the cone opening 30. The frusto-conical portion 28 causes the angular velocity of the fluid flow to increase which in turn causes a significant proportion of larger particles originally entrained in the fluid flow to become separated from the main body of the fluid flow and to become deposited in the collector 50. Due to the configuration of the cone opening 30, the particles can pass easily through the cone opening 30 and into the collector 50. There is a reduced risk of the particles collecting in the area of the cone opening 30 and causing a blockage. The cleaned fluid flow forms a vortex along the longitudinal axis 18 of the cyclone 12 and exits the cyclone 12 by way of the outlet 22. Any particles remaining in the fluid flow can be separated therefrom by providing at least one additional cyclone or filter downstream of the outlet 22 (not shown).

Figure 3:
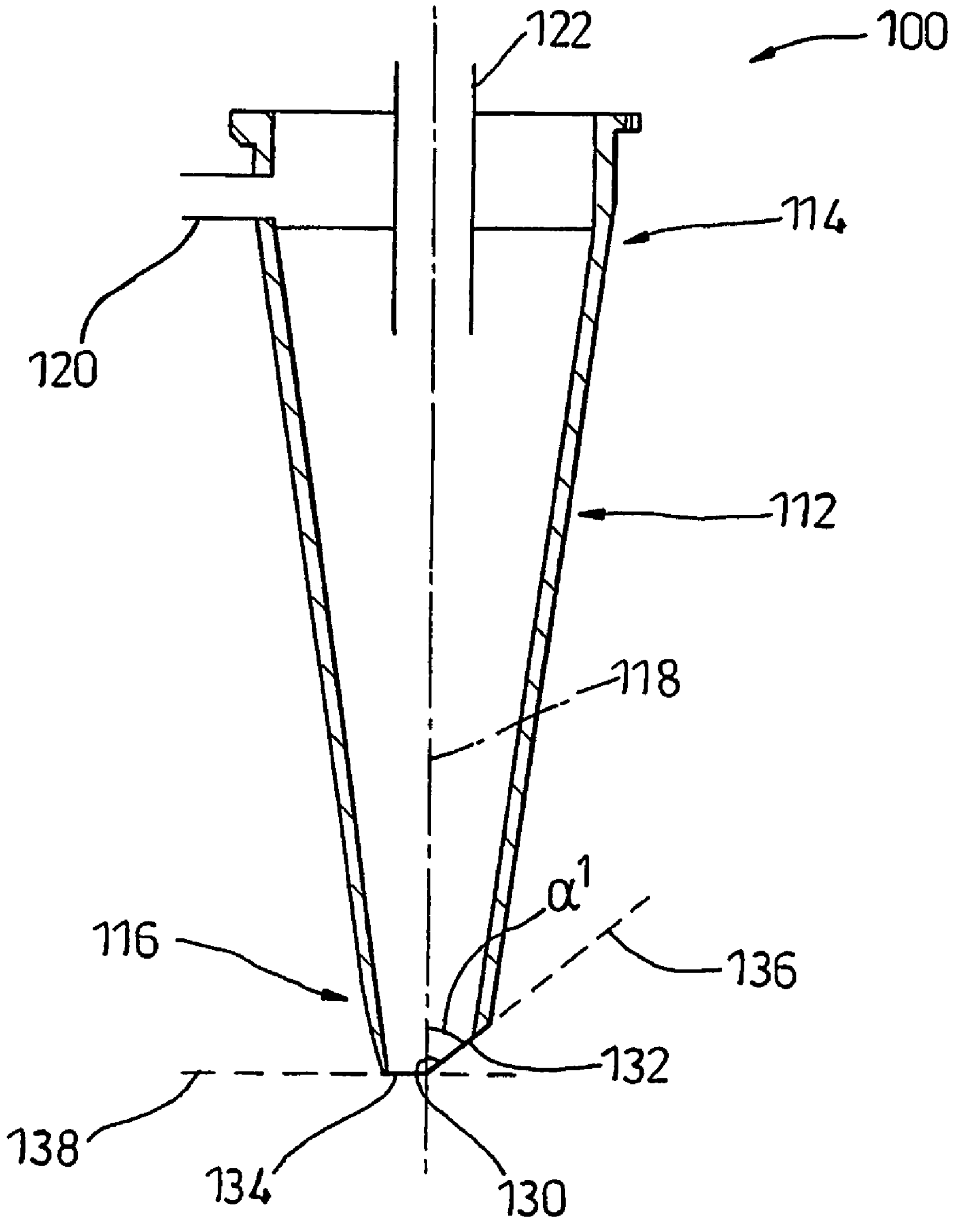
FIG. 3 is a sectional side view of cyclonic separating apparatus according to a third embodiment of the invention.

A third embodiment of the invention is shown in FIG. 3. This embodiment differs from the first embodiment in that the separating apparatus 100 comprises a cyclone 112 having a cone opening 130 which has a first portion 132 and a second portion 134. The first portion 132 lies in a plane 136 which is inclined at an angle $\alpha^1$ to the longitudinal axis 118. The angle $\alpha^1$ shown is substantially 50° but it will be appreciated that the angle $\alpha^1$ could be varied between 40° and 80°. The second portion 134 lies in a plane 138 which is perpendicular to the longitudinal axis 118. A collector may also be provided around the cyclone 112 in the same manner as the collector 50 in FIG. 2. The manner of use of the separating apparatus 100 is the same as that described for the separating apparatus 10.

Figure 4:
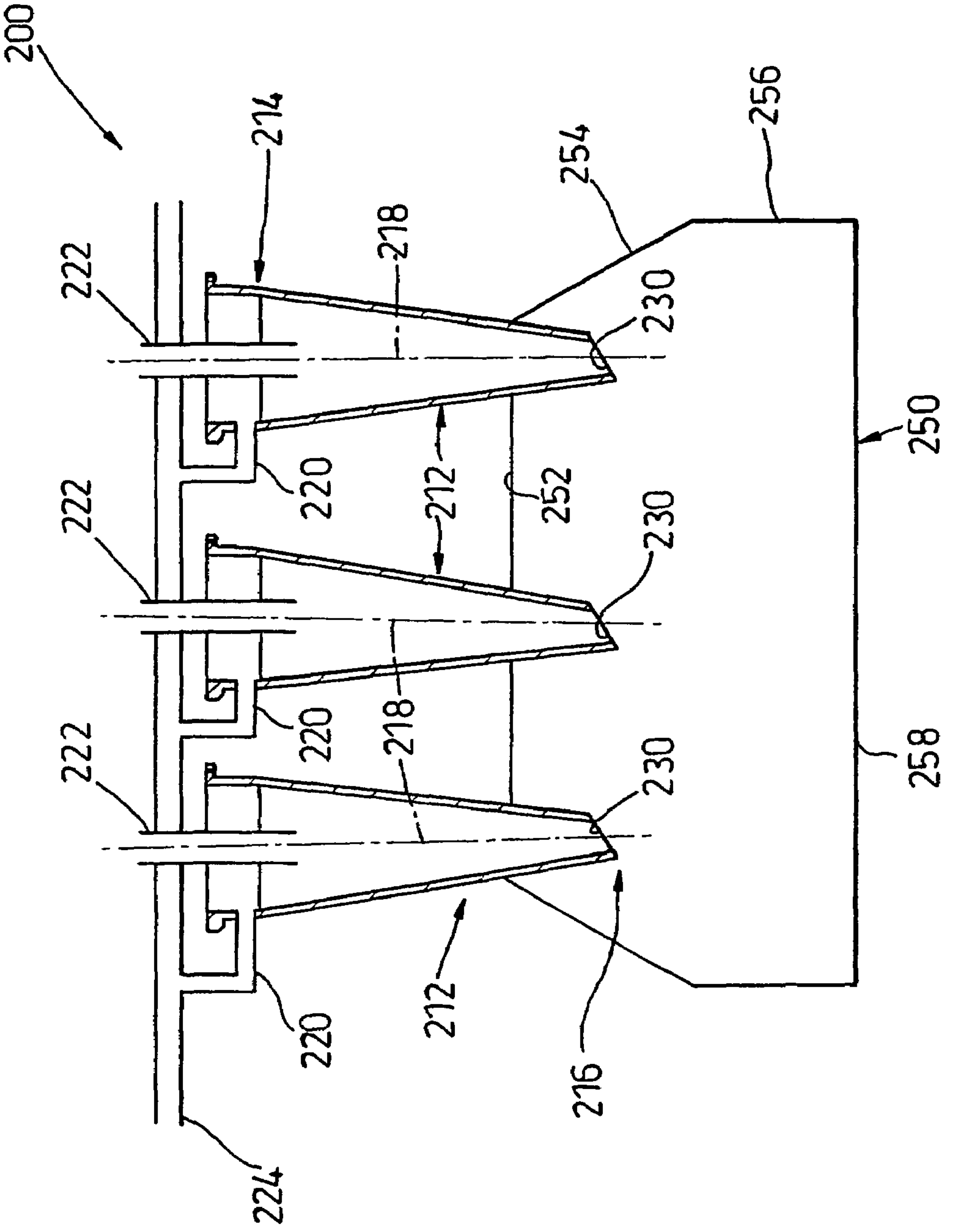
FIG. 4 is a schematic sectional side view of cyclonic separating apparatus according to a fourth embodiment of the invention.

A fourth embodiment of the invention is shown in FIG. 4. The separating apparatus 200 comprises an arrangement of parallel cyclones 212 each having the same configuration as the cyclone 12 of FIG. 1. It will be appreciated that the cyclones 212 could alternatively have the configuration of the cyclone 112 shown in FIG. 3. The cyclones 212 are arranged so as to lie alongside one another, each having a tangential inlet 220 and an outlet 222. A main inlet 224 feeds dust laden fluid flow into the separating apparatus 200 and a proportion of the fluid flow is directed into each inlet 220. Each cyclone 212 has a cone opening 230 which projects into a common collector 250 having an upper portion 252, tapering side walls 254, a cylindrical body 256 and a base portion 258. The cone opening 230 of each cyclone 212 lies in a plane which is inclined to the longitudinal axis 218 of the respective cyclone 212.

Figure 5:
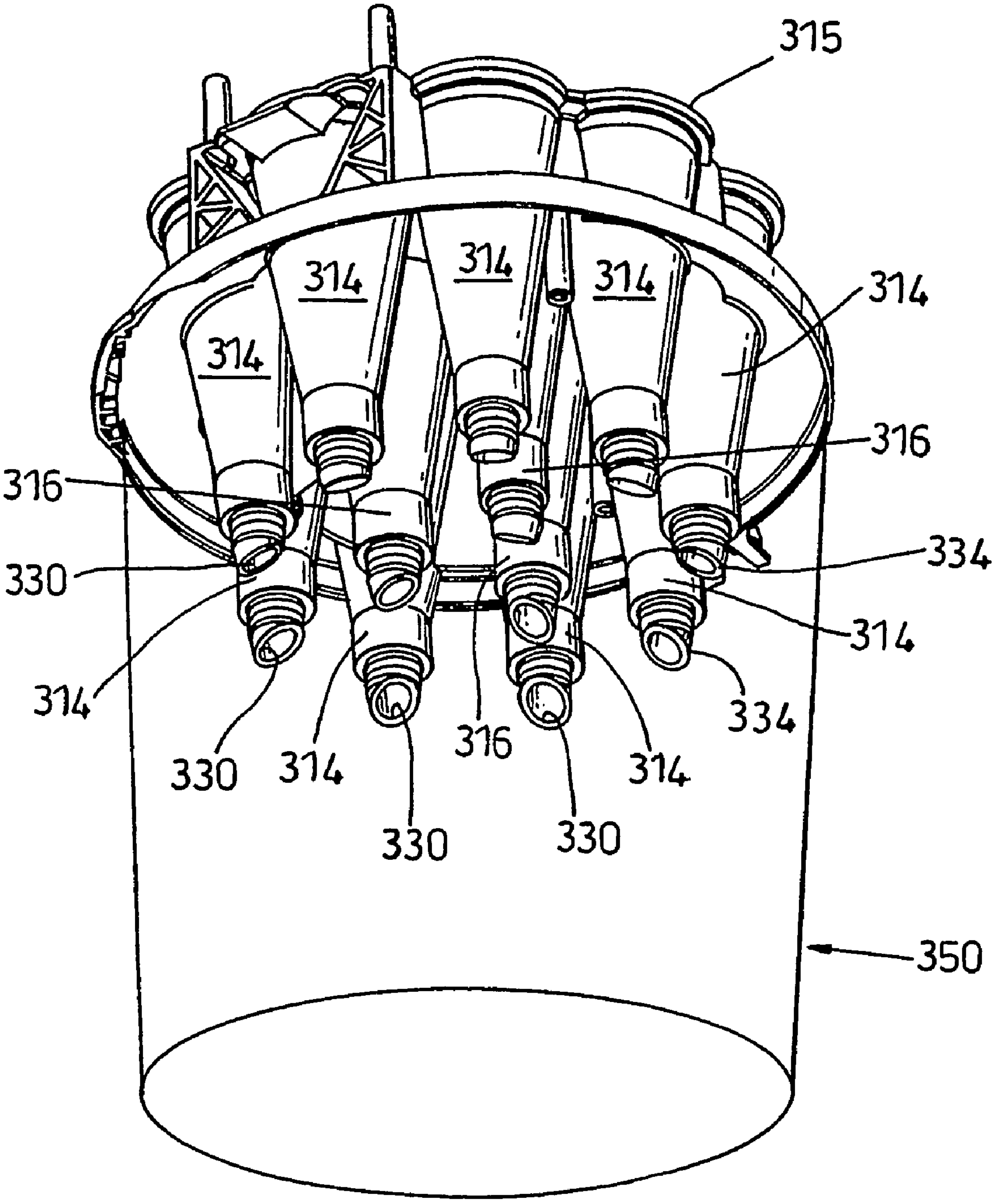
FIGS. 5 and 6 show views of cyclonic separating apparatus according to a fifth embodiment of the invention.
Figure 6:
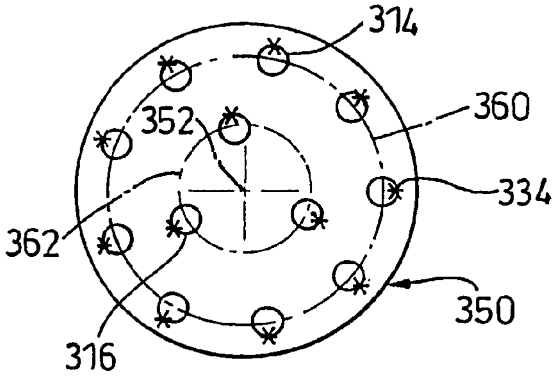

A specific arrangement of parallel cyclones is shown in FIGS. 5 and 6. Twelve cyclones project into a collector 350. The cyclones are arranged in two imaginary concentric rings 360,362 arranged about the longitudinal axis 352 of the collector 350. Nine cyclones 314 are located in an outer ring 360 and three cyclones 316 are located in an inner ring 362. The cyclones 314,316 are equi-angularly spaced about the respective rings 360,362. Each cyclone 314,316 has a cone opening 330 having a lowermost portion 334 (shown as * in FIG. 6) which is furthest from the first end 315. The lowermost portion 334 of each cyclone 314,316 faces the wall of the collector 350.

Figure 7:
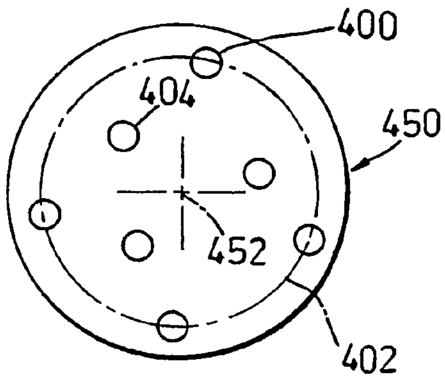
FIGS. 7 to 14 show sectional plan views of alternative configurations of cyclonic separating apparatus according to the invention.
Figure 8:
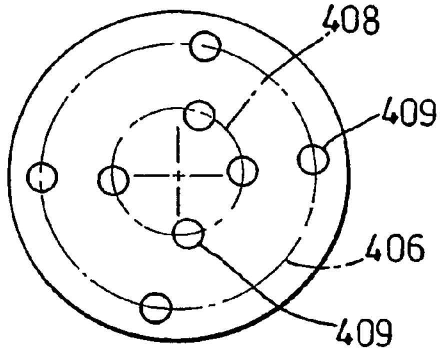
Figure 9:
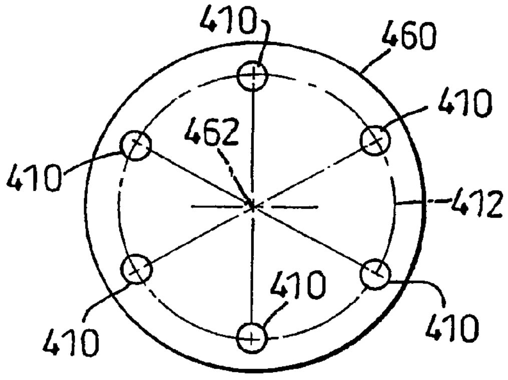
Figure 10:
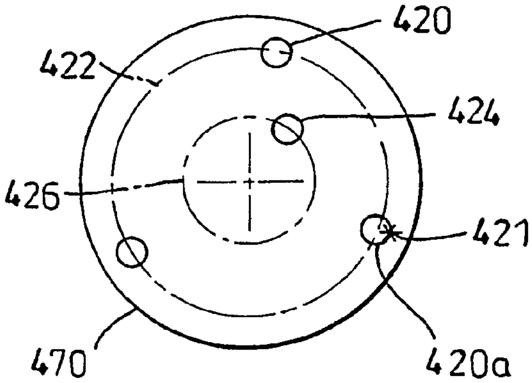
Figure 11:
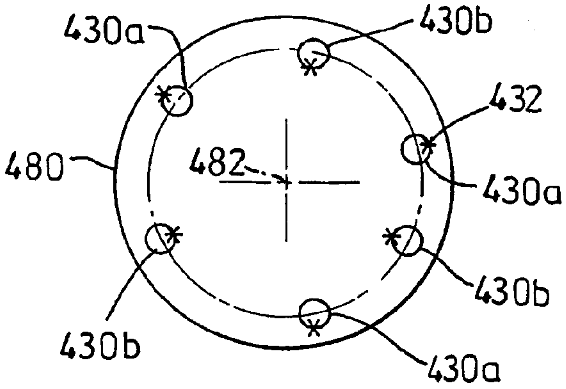
Figure 12:
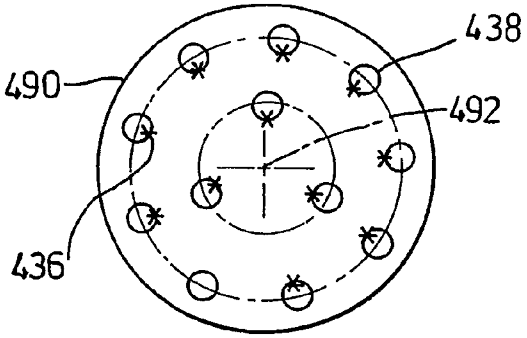
Figure 13:
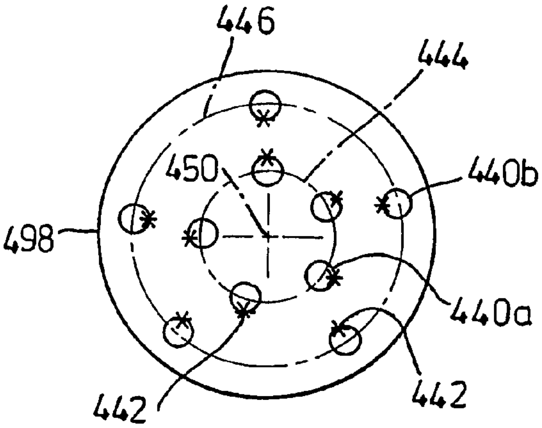
Figure 14:
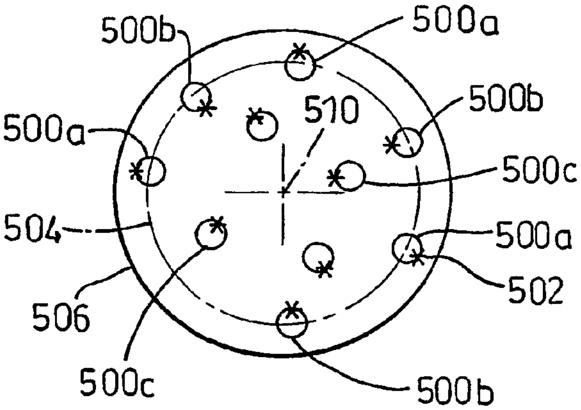

Different arrangements of parallel cyclones are contemplated. FIGS. 7 to 14 show alternative arrangements of cyclones in a collector. FIG. 7 shows four cyclones 400 being arranged in a ring 402 about a longitudinal axis 452 of the collector 450. Further cyclones 404 are spaced from the axis 452 but are not in any regular orientation. In contrast, FIG. 8 shows an outer ring 406 and an inner ring 408 each having four cyclones 409 spaced therein. FIG. 9 shows a number of cyclones 410 in an outer ring 412 which are equi-spaced about a longitudinal axis 462. FIG. 10 shows an arrangement having three cyclones 420 in an outer ring 422 and one cyclone 424 in an inner ring 426. A cyclone **420*a* in the outer ring 422 has a lowermost portion 421 which is furthest from the first end of the cyclone 420*a*. The lowermost portion 421 faces the wall of the collector 470. FIG. 11 shows an embodiment having a number cyclones 430 each having a lowermost portion 432 which is furthest from the first end of the cyclone 430. The cyclones 430 are arranged so that alternate cyclones 430*a* have the lowermost portion 432 facing the wall of the collector 480 whilst the remaining cyclones 430*b* have their lowermost portion facing the longitudinal axis 482. Alternatively, as shown in FIG. 12, all lowermost portions 436 of the cyclones 438 face the longitudinal axis 492 of the collector 490. FIG. 13 shows the cyclones 440 arranged so that the lowermost portion 442 of each cyclone 440*a* in a first ring 444 faces the wall of the collector 498 and the lowermost portion 442 of each cyclone 440*b* in a second ring 446 faces the longitudinal axis 450. FIG. 14 shows an alternative configuration having a number of cyclones 500 and each having a lowermost portion 502. Six cyclones 500 are arranged in a ring 504 so that alternate cyclones 500*a* have the lowermost portion 502 facing the wall of the collector 506. The remaining cyclones 500*b* in the ring 504 have the lowermost portion 502 facing the longitudinal axis 510. Further cyclones 500*c* are spaced from the longitudinal axis 510 but are not in any regular orientation. Alternate cyclones 500*c* have the lowermost portion 502 facing the longitudinal axis 510**.

The invention is not intended to be limited to the precise features of the embodiments described above. Other variations and modifications will be apparent to a skilled reader. It is intended that the cyclonic separating apparatus would be incorporated into a vacuum cleaner but it will be appreciated that the apparatus may also be utilised in any other suitable particle separation apparatus.

The invention claimed is:

1. A cyclonic separating apparatus comprising a plurality of cyclones provided in parallel, the cyclones each having a first end, a second end and a longitudinal axis, an inlet being located at the first end for introducing a fluid flow into each cyclone, a cone opening being located at the second end, wherein at least part of the cone opening lies in a plane inclined at an angle to the longitudinal axis.

2. The cyclonic separating apparatus as claimed in claim 1, wherein the plane is inclined at an angle of between 40° and 80° to the longitudinal axis.

3. The cyclonic separating apparatus as claimed in claim 2, wherein the plane is inclined at an angle of substantially 60° to the longitudinal axis.

4. The cyclonic separating apparatus as claimed in claim 1, 2 or 3, wherein the whole of the cone opening lies in the said plane.

5. The cyclonic separating apparatus as claimed in claim 1, 2 or 3, wherein the cyclones each have a tapered portion.

6. The cyclonic separating apparatus as claimed in claim 5, wherein the tapered portion is frusto-conical.

7. The cyclonic separating apparatus as claimed in claim 1, 2 or 3, wherein the inlets communicate tangentially with the cyclones.

8. The cyclonic separating apparatus as claimed in claim 1, 2 or 3, further comprising an outlet located at the first end.

9. The cyclonic separating apparatus as claimed in claim 1, 2 or 3, wherein the cone opening communicates with a closed collector having a longitudinal axis and a wall.

10. The cyclonic separating apparatus as claimed in claim 9, wherein the cyclones project into the collector.

11. The cyclonic separating apparatus as claimed in claim 9, wherein the collector has a portion having a circular cross section, the diameter of the said portion being at least three times the diameter of the cone opening.

12. The cyclonic separating apparatus as claimed in claim 11, wherein the said portion lies in a plane which intersects the cone opening.

13. The cyclonic separating apparatus as claimed in claim 9, wherein each of the cyclones communicates with the collector.

14. The cyclonic separating apparatus as claimed in claim 13, wherein at least some of the cyclones are arranged in a ring about the longitudinal axis of the collector.

15. The cyclonic separating apparatus as claimed in claim 14, wherein all of the cyclones are arranged in one or two rings.

16. The cyclonic separating apparatus as claimed in claim 14, wherein the cyclones are equi-angularly spaced about each ring.

17. The cyclonic separating apparatus as claimed in claim 13, wherein at least one cone opening has a lowermost portion which extends furthest from the first end of the respective cyclone and the said lowermost portion faces the wall of the collector.

18. The cyclonic separating apparatus as claimed in claim 17, wherein all of the cone openings have a lowermost portion and at least some of the lowermost portions face the wall of the collector.

19. The cyclonic separating apparatus as claimed in claim 18, wherein all of the lowermost portions face the wall of the collector.

20. The cyclonic separating apparatus as claimed in claim 18, wherein some of the lowermost portions face the longitudinal axis of the collector.

21. The cyclonic separating apparatus as claimed in claim 13, wherein at least one cone opening has a lowermost portion which extends furthest from the first end of the respective cyclone and the lowermost portion faces the longitudinal axis of the collector.

22. The cyclonic separating apparatus as claimed in claim 18, wherein the lowermost portions in an adjacent ring face the wall of the collector.

23. The cyclonic separating apparatus as claimed in claim 20, wherein alternate lowermost portions face the longitudinal axis of the collector.

24. A vacuum cleaner comprising the cyclonic separating apparatus as claimed in claim 1, 2 or 3.

25. The cyclonic separating apparatus as claimed in claim 4, wherein the cyclones each have a tapered portion.

26. The cyclonic separating apparatus as claimed in claim 10, wherein the collector has a portion having a circular cross section, the diameter of the said portion being at least three times the diameter of the cone opening.

27. The cyclonic separating apparatus as claimed in claim 26, wherein the said portion lies in a plane which intersects the cone opening.

28. The cyclonic separating apparatus as claimed in claim 15, wherein the cyclones are equi-angularly spaced about each ring.

* * * * *